(12) United States Patent
Nozaki et al.

(10) Patent No.: US 8,538,252 B2
(45) Date of Patent: Sep. 17, 2013

(54) CAMERA

(75) Inventors: Hirotake Nozaki, Port Washington, NY (US); Satoshi Ejima, Tokyo (JP); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 1242 days.

(21) Appl. No.: 12/379,538

(22) Filed: Feb. 24, 2009

(65) Prior Publication Data
US 2009/0284645 A1 Nov. 19, 2009

Related U.S. Application Data

(63) Continuation of application No. PCT/JP2007/000921, filed on Aug. 28, 2007.

(30) Foreign Application Priority Data

Sep. 4, 2006 (JP) .................................. 2006-238587

(51) Int. Cl.
G03B 3/10 (2006.01)
(52) U.S. Cl.
USPC ....................................................... 396/123
(58) Field of Classification Search
USPC ....................................................... 396/123
See application file for complete search history.

(56) References Cited

U.S. PATENT DOCUMENTS

| 5,913,082 | A * | 6/1999 | Onoda | 396/128 |
| 7,756,408 | B2 * | 7/2010 | Ito et al. | 396/123 |
| 7,778,539 | B2 * | 8/2010 | Ito | 396/104 |
| 8,009,976 | B2 * | 8/2011 | Nozaki et al. | 396/123 |
| 2002/0150308 | A1 * | 10/2002 | Nakamura | 382/286 |
| 2003/0071908 | A1 | 4/2003 | Sannoh et al. | |
| 2004/0207743 | A1 * | 10/2004 | Nozaki et al. | 348/333.12 |
| 2005/0270410 | A1 | 12/2005 | Takayama | |
| 2005/0285967 | A1 * | 12/2005 | Suda | 348/345 |
| 2006/0182433 | A1 * | 8/2006 | Kawahara et al. | 396/123 |
| 2009/0284645 | A1 * | 11/2009 | Nozaki et al. | 348/349 |

FOREIGN PATENT DOCUMENTS

| JP | A-2001-215403 | 8/2001 |
| JP | A-2002-333652 | 11/2002 |
| JP | A-2003-92700 | 3/2003 |
| JP | 2003-107335 | * 4/2003 |
| JP | A-2003-107335 | 4/2003 |
| JP | A-2003-156680 | 5/2003 |
| JP | A-2005-86682 | 3/2005 |
| JP | A-2006-3428 | 1/2006 |
| JP | A-2006-18246 | 1/2006 |
| JP | A-2006-191467 | 7/2006 |
| JP | A-2006-211139 | 8/2006 |
| JP | A-2006-215398 | 8/2006 |
| JP | A-2006-227080 | 8/2006 |

* cited by examiner

*Primary Examiner* — Rodney Fuller
(74) *Attorney, Agent, or Firm* — Oliff & Berridge, PLC

(57) ABSTRACT

A face detecting section of a camera detects a face area in a shooting screen under an output of an image sensor. A focus detecting section calculates a defocus amount from a relative interval of a pair of images under an optical flux passed through a shooting lens in each of optional areas in the shooting screen. A first focus controlling section specifies a focus detecting area from the optional areas under an output of the face detecting section, and performs a focus operation under the defocus amount of the focus detecting area. A second focus controlling section calculates a focus evaluation value in the face area under an output of the image sensor, and performs a focus operation by using the focus evaluation value. A control section causes at least one of the first focus controlling section and the second focus controlling section to perform a focus operation.

14 Claims, 9 Drawing Sheets

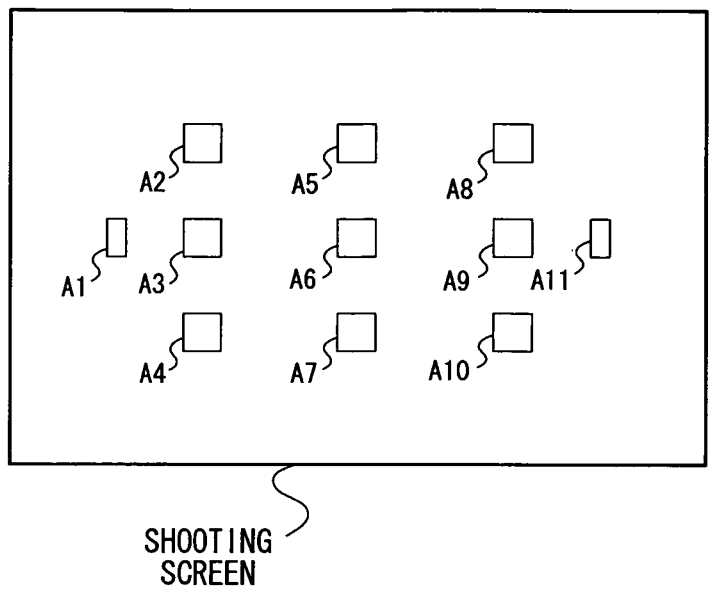
F I G. 3
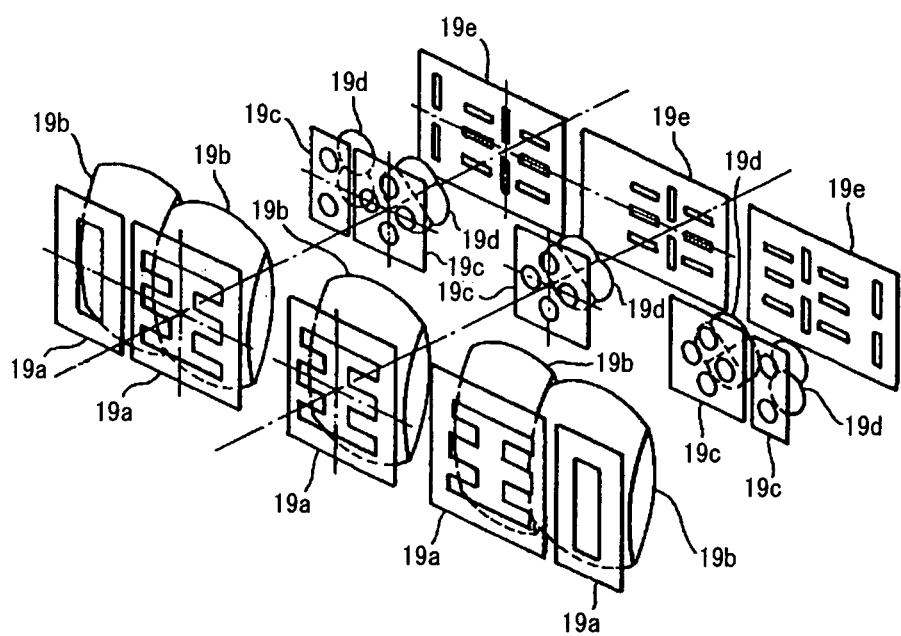
F I G. 4

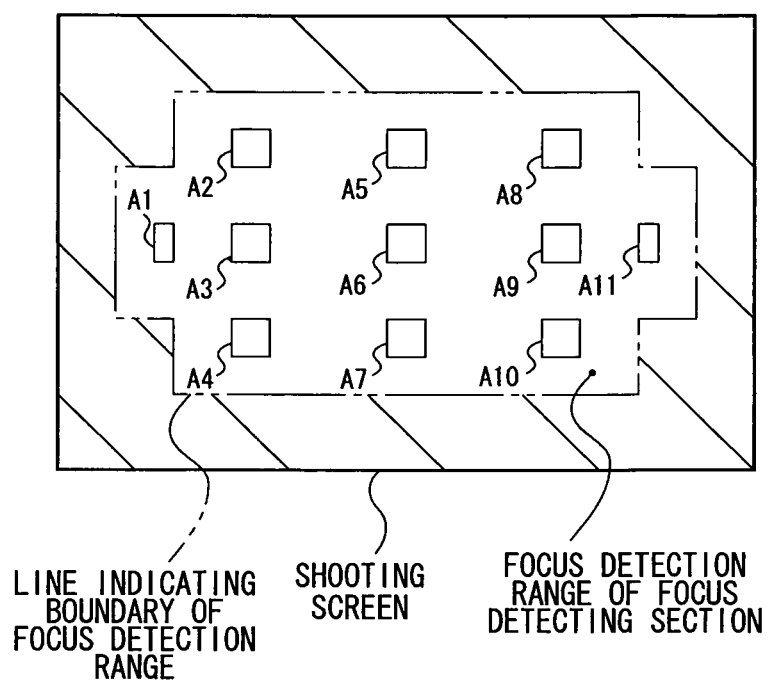
F I G. 6

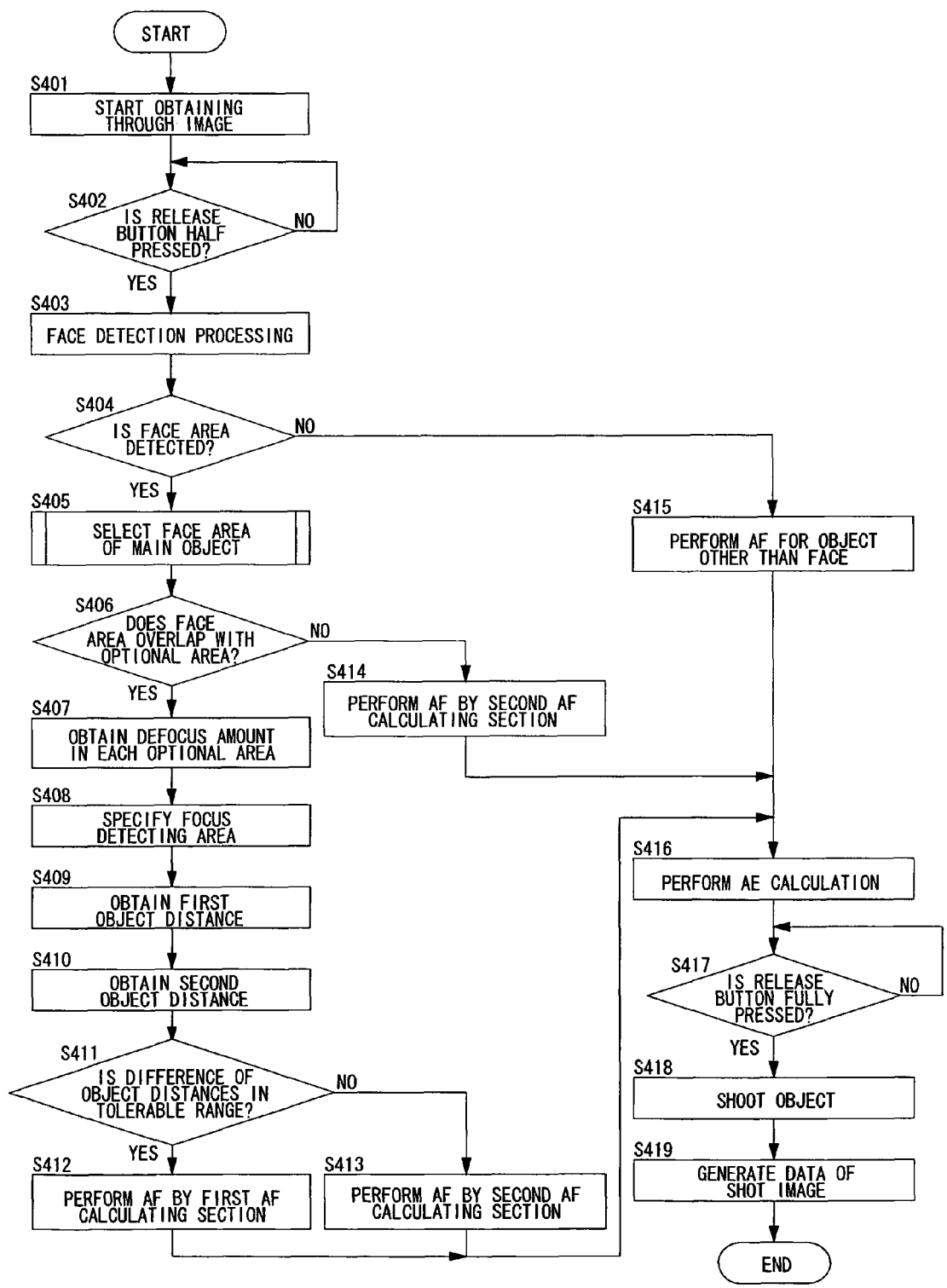
F I G. 9

CAMERA

CROSS-REFERENCE TO RELATED APPLICATION

This application is a continuation application of International Application No. PCT/JP2007/000921, filed Aug. 28, 2007, designating the U.S., in which the International Application claims a priority date of Sep. 4, 2006, based on prior filed Japanese Patent Application No. 2006-238587, the entire contents of which are incorporated herein by reference.

BACKGROUND

1. Field

The present invention relates to a camera which performs focus control based on a result of face detection.

2. Description of the Related Art

Conventionally, as shown in Japanese Unexamined Patent Application Publication No. 2005-86682 for example, cameras performing automatic focus control (AF) by detecting a face of an object within a shooting screen are publicly known. Particularly, in recent years, it is considered to realize AF with face detection in a single lens reflex type camera.

Here, when performing AF of face detection in a single lens reflex type camera, the following problems are pointed out. The majority of single lens reflex type cameras are models employing a focus detecting device of a phase difference detection method for performing high-speed AF. However, the focus detecting device of the phase difference detection method has a difficulty in focus detection on the entire region of a shooting screen, and has a device structure that is not suitable for face detection processing.

On the other hand, for performing face detection AF, a structure is also conceivable that performs image-plane AF by a contrast detection method with an image sensor for performing face detection. With contrast detection AF, it is possible to perform AF on the entire region of the shooting screen. However, the contrast detection AF takes time for a focus operation because it searches for a focus position by comparison with focus evaluation values of the previous time. Therefore, particularly for single lens reflex type cameras, it is strongly demanded to realize face detection AF that is highly practical. Note that Japanese Unexamined Patent Application Publication No. 2005-86682 does not disclose any means for solving the above-described problems.

SUMMARY

The present invention is for solving the above-described conventional problems. An object of the present invention is to provide a highly practical single lens reflex type camera which realizes an optimum AF operation based on a result of face detection.

A camera according to a first invention includes an image sensor, a face detecting section, a focus detecting section, a first focus controlling section, a second focus controlling section, and a control section. The image sensor images an object image. The face detecting section detects a face area in a shooting screen based on an output of the image sensor. The focus detecting section has a plurality of optional areas in the shooting screen and calculates a defocus amount from a relative interval of a pair of images based on an optical flux passed through a shooting lens in each of the optional areas. The first focus controlling section specifies a focus detecting area from the optional areas based on an output of the face detecting section, and performs a focus operation of the shooting lens based on the defocus amount of the focus detecting area. The second focus controlling section calculates a focus evaluation value in the face area based on an output of the image sensor, searches a lens position where the focus evaluation value becomes a maximum value, and performs a focus operation. The control section causes at least one of the first focus controlling section and the second focus controlling section to perform a focus operation.

In a second invention according to the first invention, when the face area is detected within a calculable range of the defocus amount, the control section causes the first focus controlling section to perform a focus operation, and thereafter further causes the second focus controlling section to perform a focus operation.

In a third invention according to the first invention, when the face area is detected outside a calculable range of the defocus amount, the control section causes the second focus controlling section to perform a focus operation.

In a fourth invention according to the first invention, the camera further includes an alarm section. The alarm section alarms a user when the face area is detected outside a calculable range of the defocus amount.

In a fifth invention according to the first invention, the camera further includes an object distance calculating section. The object distance calculating section calculates a first object distance based on the defocus amount of the focus detecting area and calculates a second object distance based on a size of the face area, when the face area is detected within a calculable range of the defocus amount. Then the control section determines necessity of a focus operation of each of the first focus controlling section and the second focus controlling section based on a difference between the first object distance and the second object distance.

In a sixth invention according to the second invention, when there is a plurality of the optional areas corresponding to the face area, the first focus controlling section specifies one of the optional areas closest to a center of the face area as the focus detecting area.

In a seventh invention according to the second invention, when there is a plurality of the optional areas corresponding to the face area, the first focus controlling section specifies one of the optional areas corresponding to positions of eyes of the face area as the focus detecting area.

In an eighth invention according to the seventh invention, when there is a plurality of the optional areas corresponding to positions of eyes of the face area, the first focus controlling section specifies one of the optional areas closest to a center of the shooting screen as the focus detecting area.

In a ninth invention according to the seventh invention, when there is a plurality of the optional areas corresponding to positions of eyes of the face area, the first focus controlling section specifies one of the optional areas where the eyes of the face area are on a side closest to the camera as the focus detecting area.

In a tenth invention according to the second invention, the camera further includes a memory and a face recognizing section. The memory records registration data indicating feature points of a face to be a recognized target. The face recognizing section extracts feature points of a face of an object from the face area, and determines whether or not the face area is the recognized target based on data of the feature points extracted from the face area and the registration data. Then, when detected number of the face area is two or more, the first focus controlling section specifies the focus detecting area from one of the optional areas corresponding to the face of the recognized target.

In an eleventh invention according to the second invention, when detected number of the face area is two or more, the first focus controlling section specifies the focus detecting area from one of the optional areas corresponding to a face on a side closest to the camera.

In a twelfth invention according to the eleventh invention, the first focus controlling section specifies the focus detecting area from a face of which portions of eyes of the face area are on the side closest to the camera.

In a thirteenth invention according to the first invention, the camera further includes a memory and a face recognizing section. The memory records registration data indicating feature points of a face to be a recognized target. The face recognizing section extracts feature points of a face of an object from the face area, and determines whether or not the face area is the recognized target based on data of the feature points extracted from the face area and the registration data. Then, when the face area of the recognized target is detected outside a calculable range of the defocus amount, the control section causes the second focus controlling section to perform a focus operation based on the face area of the recognized target.

In a fourteenth invention according to the first invention, the camera further includes a memory, a face recognizing section, and an alarm section. The memory records registration data indicating feature points of a face to be a recognized target. The face recognizing section extracts feature points of a face of an object from the face area, and determines whether or not the face area is the recognized target based on data of the feature points extracted from the face area and the registration data. The alarm section alarms a user when the face area of the recognized target is detected outside a calculable range of the defocus amount.

In a fifteenth invention according to the first invention, the control section adjusts a depth of field based on the defocus amount obtained from each of a plurality of the optional areas located in the face area.

In a sixteenth invention according to the first invention, when a size of the face area is equal to or larger than a threshold, the control section causes the first focus controlling section to perform a focus operation and thereafter further causes the second focus controlling section to perform a focus operation. Further, when the size of the face area is smaller than the threshold, the control section causes the first focus controlling section to perform a focus operation.

BRIEF DESCRIPTION OF THE DRAWINGS

FIG. 3 is a diagram showing an arrangement of optional areas in a shooting screen.

FIG. 4 is a perspective view showing an overview of an optical system of a focus detecting section in the first embodiment.

FIG. 6 is a diagram showing an example of a focus detection range of the focus detecting section in the shooting screen.

FIG. 9 is a flowchart showing a shooting operation example of an electronic camera in a third embodiment.

DETAILED DESCRIPTION OF THE EMBODIMENTS (Description of a First Embodiment)

Figure 1:
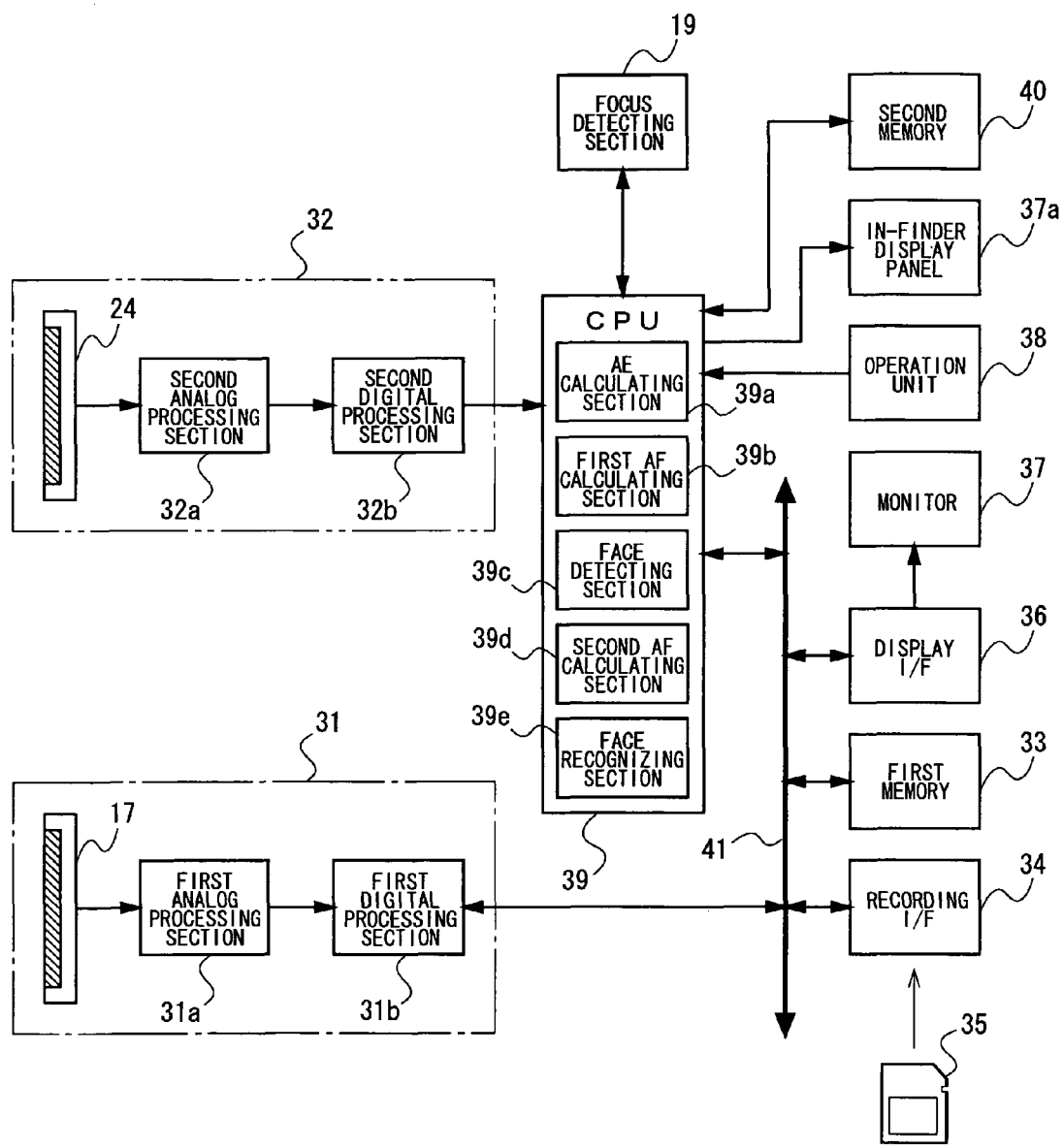
FIG. 1 is a block diagram showing a structure of an electronic camera of a first embodiment.
Figure 2:
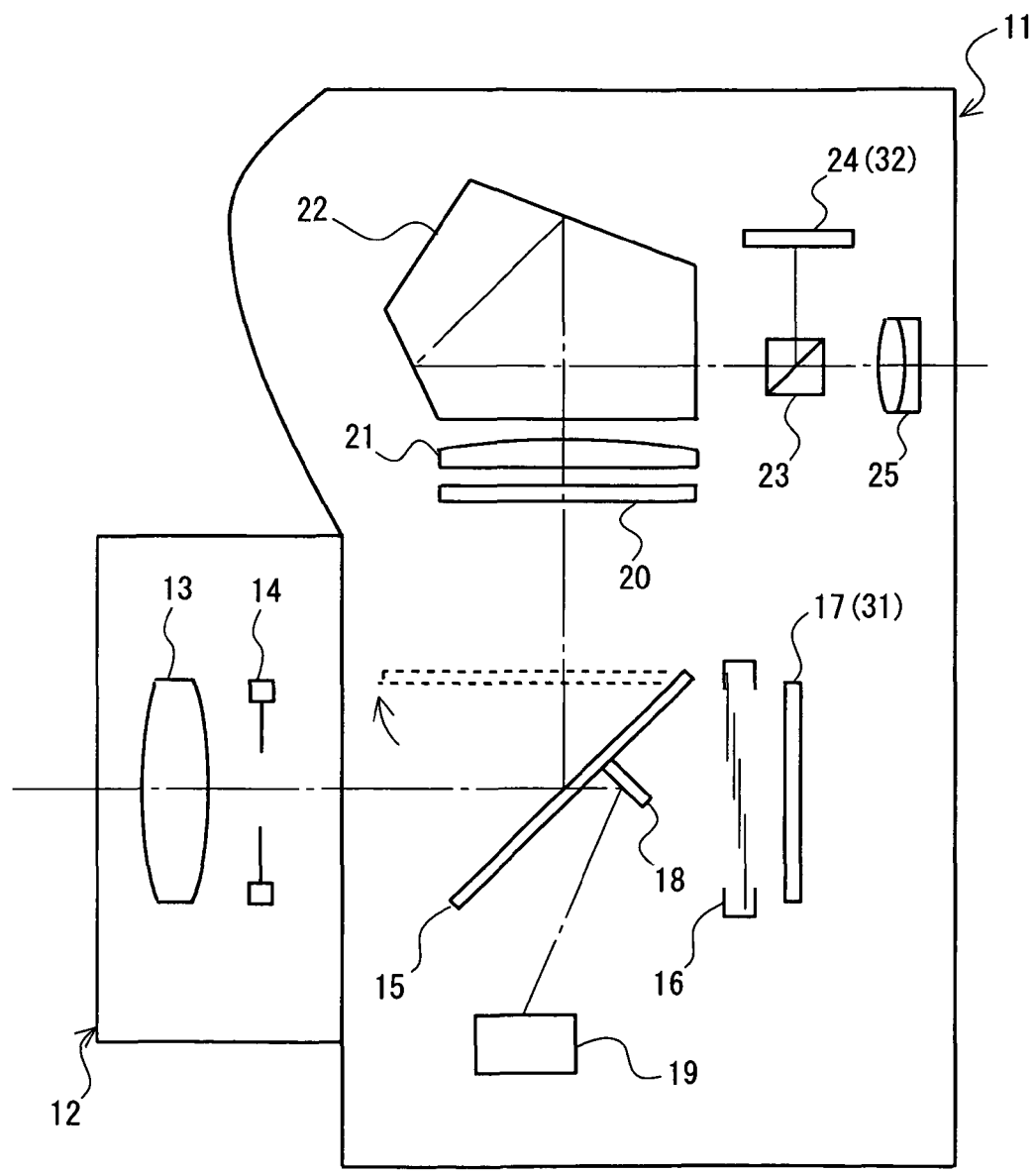
FIG. 2 is a schematic diagram showing a photographing mechanism of the electronic camera of the first embodiment.

FIG. 1 is a block diagram showing a structure of an electronic camera of a first embodiment. FIG. 2 is a schematic diagram showing a photographing mechanism of the electronic camera of the first embodiment.

First, the photographing mechanism of the electronic camera will be described with reference to FIG. 2. The electronic camera of the first embodiment has a camera body 11 and a lens unit 12 housing a photographing optical system.

Here, the camera body 11 and the lens unit 12 are provided respectively with a pair of mounts (not shown) in a male-female relationship. The lens unit 12 is coupled replaceably to the camera body 11 by coupling the above mounts by a bayonet mechanism or the like. Further, the mounts are each provided with an electrical contact. When the camera body 11 and the lens unit 12 are coupled, an electrical connection is established between them by the contact between the electrical contacts.

The lens unit 12 has a focusing lens 13 for focus position adjustment and a diaphragm 14. The focusing lens 13 is structured movably in an optical axis direction by a not-shown motor. The diaphragm 14 adjusts an incident light amount in the camera body 11 by opening/closing diaphragm blades.

The camera body 11 has a main mirror 15, a mechanical shutter 16, a first image sensor 17, a sub-mirror 18, a focus detecting section 19, and a finder optical system (20 to 25). The main mirror 15, the mechanical shutter 16, and the first image sensor 17 are arranged along the optical axis of the photographing optical system. The sub-mirror 18 is arranged behind the main mirror 15. Further, the finder optical system is arranged in an upper region of the camera body 11. Moreover, the focus detecting section 19 is arranged in a lower region of the camera body 11.

The main mirror 15 is pivotally supported by a not-shown pivot shaft, and is capable of switching between an observation state and a retracted state. The main mirror 15 in the observation state is arranged obliquely in front of the mechanical shutter 16 and the first image sensor 17. The main mirror 15 in the observation state reflects upward an optical flux passed through the photographing optical system and guides it to the finder optical system. Further, a center portion of the main mirror 15 is a half mirror. Part of the optical flux transmitted through the main mirror 15 is then bent downward by the sub-mirror 18 and is guided to the focus detecting section 19. On the other hand, the main mirror 15 in the retracted state is flipped upward together with the sub-mirror 18 and is at a position deviated from a photographing optical path. When the main mirror 15 is in the retracted state, the optical flux passed through the photographing optical system is guided to the mechanical shutter 16 and the first image sensor 17.

The finder optical system has a diffusion screen (focus plate) 20, a condenser lens 21, a pentagonal prism 22, a beam splitter 23, a second image sensor 24, and an eyepiece lens 25. The diffusion screen 20 is located above the main mirror 15, and images once the optical flux reflected by the main mirror 15 in the observation state. The optical flux imaged on the diffusion screen 20 passes through the condenser lens 21 and the pentagonal prism 22 and is guided to the beam splitter 23 via an exit surface at a 90° angle with an incident surface of the pentagonal prism 22. The beam splitter 23 branches the incident optical flux in two directions. One optical flux passing through the beam splitter 23 is guided to the second image sensor 24 via a secondary imaging lens (not shown). Further, the other optical flux passing through the beam splitter 23 reaches the user's eye via the eyepiece lens 25.

Next, a circuit structure of the electronic camera will be described with reference to FIG. 1. The camera body 11 has the focus detecting section 19, a recording-purpose imaging section 31, an analyzing-purpose imaging section 32, a first memory 33, a recording I/F 34, a display I/F 36, a monitor 37, an in-finder display panel 37a, an operation unit 38, a CPU 39, a second memory 40, and a system bus 41. Here, the recording-purpose imaging section 31, the first memory 33, the recording I/F 34, the display I/F 36, and the CPU 39 are coupled via the system bus 41. Note that illustration of input/output of the CPU 39 from/to the lens unit 12 side is omitted in FIG. 1.

The focus detecting section 19 detects a focusing state in optional areas set in advance in a shooting screen. The focus detecting section 19 of the first embodiment has 11 optional areas in the shooting screen. In FIG. 3, an arrangement of optional areas (A1 to A11) within the shooting screen is shown. In a center portion of the shooting screen, optional areas A2 to A10 are arranged in a 3×3 lattice form. Further, on left and right sides in the shooting screen, optional areas A1 and A11 are arranged across the aforementioned optional areas arranged in a lattice form.

Further, FIG. 4 shows an overview of the optical system of the focus detecting section 19 of the first embodiment. This focus detecting section 19 includes five groups of focus detecting optical systems. The left and right focus detecting optical systems in FIG. 4 correspond to the optional areas A1 and A11, respectively. Then three focus detecting optical systems in the middle correspond to the optional areas A2 to A10, respectively. Each of the focus detecting optical systems has a visual field mask 19a, a condenser lens 19b, an aperture mask 19c, a separator lens 19d, and a line sensor 19e. In FIG. 4, a king-shaped (back-to-back E shaped) opening is formed in the visual field mask 19a of each of the three focus detecting optical systems in the middle. Further, a longitudinally shaped opening extending in a vertical direction is formed in the visual field mask 19a of each of the focus detecting optical systems on the left and right sides. Then the respective focus detecting optical systems divide an optical flux from an object by the condenser lenses 19b and the separator lenses 19d, and detect an image displacement amount of the object from an interval of two images by the line sensors 19e corresponding to the respective optional areas.

The recording-purpose imaging section 31 has the first image sensor 17, a first analog processing section 31a, and a first digital processing section 31b.

The first image sensor 17 is a sensor for generating a recording-purpose shot image. This first image sensor 17 photoelectrically converts an object image that is passed through the photographing optical system and imaged when the shutter is released so as to generate an analog signal of a shot image. An output signal of the first image sensor 17 is input to the first analog processing section 31a.

The first analog processing section 31a is an analog front-end circuit having a CDS circuit, a gain circuit, an A/D converter circuit, and so on. The CDS circuit reduces noise components in an output of the first image sensor 17 by correlated double sampling. The gain circuit amplifies the gain of an input signal and outputs it. This gain circuit is capable of adjusting photographing sensitivity corresponding to the ISO sensitivity. The A/D converter circuit performs A/D conversion of an output signal of the first image sensor 17. Note that illustration of the respective circuits of the first analog processing section 31a is omitted in FIG. 1.

The first digital processing section 31b performs various types of image processing (defective pixel correction, color interpolation, gradation conversion processing, white balance adjustment, edge enhancement, and so on) on an output signal of the first analog processing section 31a so as to generate data of a shot image. Further, the first digital processing section 31b also performs companding processing of data of a shot image, or the like. This first digital processing section 31b is coupled to the system bus 41.

The analyzing-purpose imaging section 32 has the second image sensor 24, a second analog processing section 32a, and a second digital processing section 32b. Note that the structure of the analyzing-purpose imaging section 32 substantially corresponds to the structure of the recording-purpose imaging section 31, and thus part of description regarding overlapping portions of the both is omitted.

The second image sensor 24 is a sensor for analyzing the status of an object in the shooting screen when waiting for shooting. The second image sensor 24 photoelectrically converts an object image, which is passed through the finder optical system and imaged, at every predetermined interval so as to generate an analog signal of a through image. Data of this through image is used for automatic exposure (AE) calculation and face detection processing, which will be described later. An output signal of the second image sensor 24 is input to the second analog processing section 32a.

The second analog processing section 32a is an analog front-end circuit having a CDS circuit, a gain circuit, an A/D conversion circuit, and so on. The second digital processing section 32b performs color interpolation processing or the like of the through image. Note that the data of the through image output from the second digital processing section 32b is input to the CPU 39.

The first memory 33 is a buffer memory for temporarily recording data of a shot image in a preceding or succeeding process or the like of image processing by the first digital processing section 31b.

In the recording I/F 34, a connector for coupling a recording medium 35 is formed. Then the recording I/F 34 performs writing/reading of data of a shot image from/to the recording medium 35 coupled to the connector. The aforementioned recording medium 35 is formed of a memory card or the like including a hard disk or a semiconductor memory. Note that in FIG. 1 a memory card is shown as an example of the recording medium 35.

The display I/F 36 controls display of the monitor 37 based on an instruction from the CPU 39. The monitor 37 displays various images in response to instructions of the CPU 39 and the display I/F 36. The monitor 37 in the first embodiment is formed of a liquid crystal display monitor. On the monitor 37, a reproduced image of a shot image, a menu screen capable of inputting in a GUI (graphical user interface) form, and/or the like can be displayed. Further, on the monitor 37, it is also possible to display by moving image the state of a field when on standby for shooting based on the through image of the analyzing-purpose imaging section 32 (note that illustration of the above images is omitted).

The in-finder display panel 37a is a panel for presenting information of the electronic camera (shooting condition and various alarm displays) to the user looking through the finder optical system. This in-finder display panel 37a displays the above information in a periphery of a finder image corresponding to the shooting screen by switching on and off of lights of plural display segments. In addition, control of display of the in-finder display panel 37a is performed by the CPU 39.

The operation unit 38 has a release button, an operating button, and so on. The release button of the operation unit 38 accepts from the user an instruction input of starting an exposure operation. The operating button of the operation unit 38 accepts from the user an input on the aforementioned menu screen or the like, an input of switching a shooting mode of the electronic camera, or the like.

The CPU 39 controls operations of respective parts of the electronic camera, and performs various calculations needed for photographing. For example, the CPU 39 drives the main mirror 15, the mechanical shutter 16, and so on when shooting. Further, the CPU 39 controls operations of the focusing lens 13 and the diaphragm 14 of the lens unit 12 via the mounts.

Further, the CPU 39 functions as an AE calculating section 39a, a first AF calculating section 39b, a face detecting section 39c, a second AF calculating section 39d, and a face recognizing section 39e by a program stored in a not-shown ROM.

The AE calculating section 39a performs a publicly known AE calculation based on an output of the analyzing-purpose imaging section 32 and decides shooting conditions (exposure time, aperture value, photographing sensitivity) for shooting.

The first AF calculating section 39b selects a focus detecting area from the optional areas of the focus detecting section 19. The first AF calculating section 39b then calculates a defocus amount (displacement amount and displacement direction from the focus position) of the focus lens based on an output of the focus detecting area in the focus detecting section 19. Further, the first AF calculating section 39b selects the focus detecting area based on a result of face detection processing by the face detecting section 39c. Further, the first AF calculating section 39b is also capable of obtaining from the lens unit 12 the position of the focus lens when focusing, and calculating an object distance in each of the optional areas.

The face detecting section 39c detects a face area of an object, the size of a face, and so on from the data of the through image. For example, the face detecting section 39c extracts a face area by extraction processing of feature points of a face, which is described in Japanese Unexamined Patent Application Publication No. 2001-16573 or the like. Further, examples of the above-described feature points include end points of eyebrows, eyes, a nose, and lips, edges points of a face, a vertex point of a head, a lower end point of a chin, and the like.

The second AF calculating section 39d performs a publicly known AF calculation by a contrast detection method based on the data of the through image. That is, the second AF calculating section 39d integrates the absolute value of a high frequency component of the through image to generate a focus evaluation value related to a predetermined object image. Further, the second AF calculating section 39d compares focus evaluation values before and after moving the focusing lens 13 to search lens positions where the focus evaluation values become maximum values, and performs a focus operation. The second AF calculating section 39d is capable, too, of performing an object distance based on the position of the focus lens when focusing.

The face recognizing section 39e generates face recognizing data based on feature points detected by the face detecting section 39c. For example, the face recognizing section 39e generates face recognizing data of a registered person as a recognized target from positions of detected feature points of a face, sizes of face parts obtained from the feature points, relative distances between the feature points, and so on.

Further, the face recognizing section 39e performs face recognition processing to determine whether or not the face of a person in the shooting screen is the face of a person of the face recognizing data. Specifically, based on detected feature points of a face, the face recognizing section 39e first calculates positions of feature points of the face of a photographed person, sizes of face parts, relative distances of feature points, and so on. Next, the face recognizing section 39e compares the above calculation results and the face recognizing data, and obtains the degree of similarity between the face of the person of the face recognizing data and the face of the photographed person. The face recognizing section 39e then determines that the photographed person matches with the person of the face recognizing data when the degree of similarity exceeds a threshold value.

The second memory 40 is coupled to the CPU 39. In the second memory 40, the face recognizing data generated in the face recognizing section 39e is recorded. In this second memory 40, a group folder can be generated for each registered person, and face recognizing data can be grouped for each registered person with the group folder. For example, in the group folder, plural sets of face recognizing data can be recorded which are different in face direction, shooting condition, and so on for the same registered person.

Figure 5:
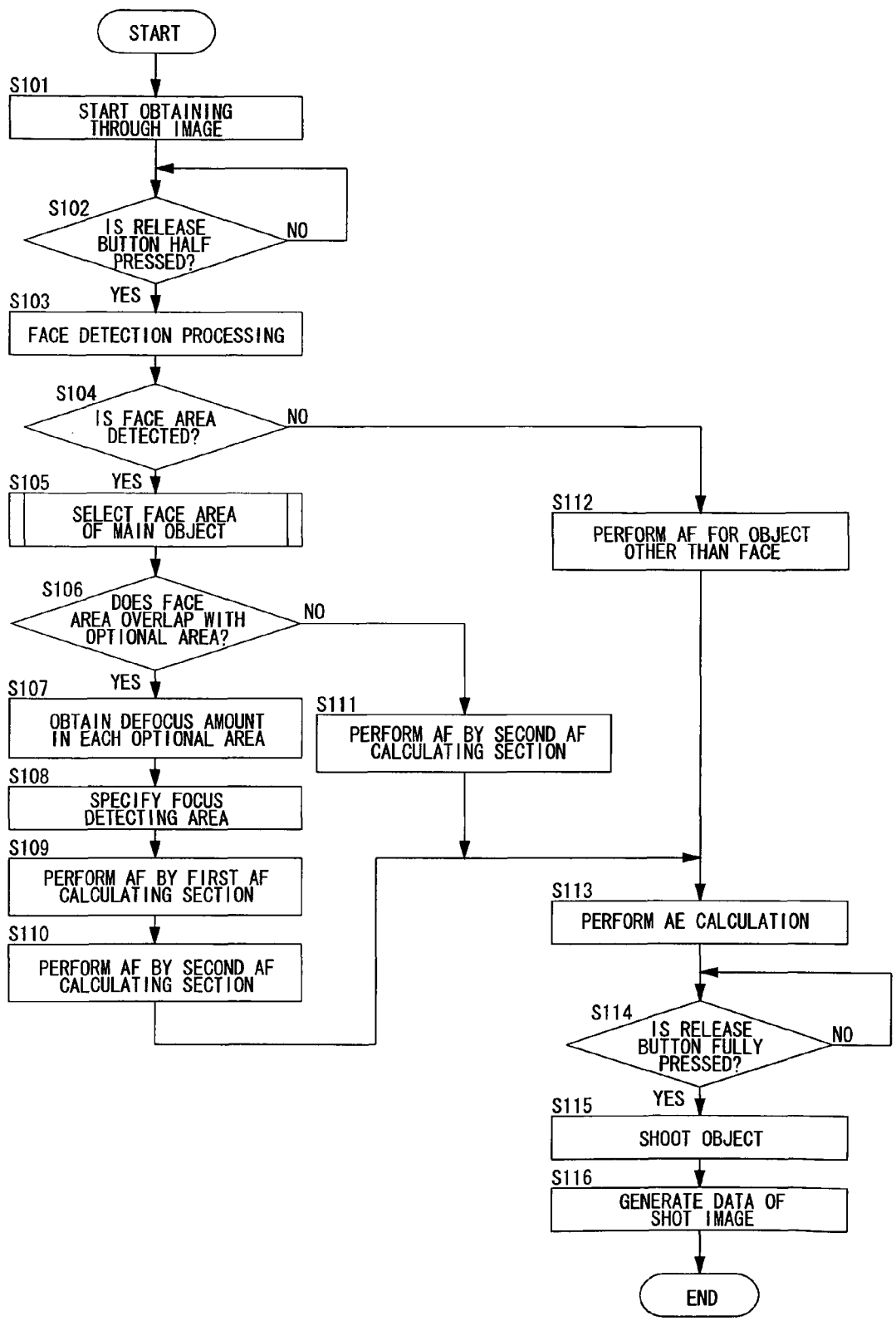
FIG. 5 is a flowchart showing an example of a shooting operation of the electronic camera in the first embodiment.

Next, with reference to a flow chart of FIG. 5, an example of shooting operations of the electronic camera of the first embodiment will be described. Note that the following description is given under the assumption that the face detecting function of the electronic camera is set to ON in advance, and the user performs framing with the finder optical system.

Step 101: when the operation unit 38 accepts a start operation of a shooting mode from the user, the CPU 39 instructs the analyzing-purpose imaging section 32 to start obtaining a through image. The CPU 39 drives the second image sensor 24 at every predetermined interval to obtain the through image sequentially. Incidentally, the main mirror 15 is at the position of the observation state in the stage of S101.

Step 102: the CPU 39 determines whether the release button is half pressed or not. When the release button is half pressed (YES side), the process proceeds to S103. On the other hand, when there is no input on the release button (NO side), the CPU 39 waits for half pressing of the release button.

Step 103: the face detecting section 39c of the CPU 39 performs face detection processing on data of the through image to detect a face area in the shooting screen. Incidentally, in the first embodiment, the face detecting section 39c performs the face detection processing targeted at the entire range of the shooting screen.

Step 104: the CPU 39 determines whether a face area is detected or not by the face detection processing in S103. When this condition is met (YES side), the process proceeds to S105. On the other hand, when this condition is not met (NO side), the process proceeds to S112.

Step S105: the face detecting section 39c of the CPU 39 specifies a face area of a main object based on the face detection result of S103. Details of an algorithm for selecting the main object in this S105 will be described later.

Step 106: the CPU 39 determines whether or not the face area of the main object set in S105 overlaps with any one of the optional areas. In addition, an example of a focus detection range of the focus detecting section 19 in the first embodiment is shown schematically in FIG. 6. As a matter of course, when the object overlaps with no optional area, focus detection in the focus detecting section 19 cannot be performed. When this condition is met (YES side), the process proceeds to S107. On the other hand, when this condition is not met (NO side), the process proceeds to S111.

Step S107: the first AF calculating section 39b of the CPU 39 obtains a defocus amount of each of the optional areas from the focus detecting section 19.

Step 108: the first AF calculating section 39b of the CPU 39 specifies the focus detecting area from the optional area corresponding to the face area (S105) of the main object. Here, when there is one optional area corresponding to the face area of the main object, the first AF calculating section 39b specifies this optional area as the focus detecting area. On the other hand, when there are plural optional areas corresponding to the face area of the main object, the first AF calculating section 39b selects the optional area to be the focus detecting area by the following method (1) or (2).

(1) The first AF calculating section 39b specifies the optional area closest to the center of a face area of the selected target as the focus detecting area. This center of the face area changes depending on the direction of the face. For example, on a front side of the face, the vicinity of the nose is the center of the face, and on a side of the face, the vicinity of the ear is the center of the face.

Specifically, the first AF calculating section 39b obtains the center of a face with reference to the edge of the face or a fresh color region that can be assumed as a face, and specifies the focus detecting area. Alternatively, the first AF calculating section 39b may obtain the center of a face from a positional relationship of the parts (eyes, nose, mouth, and so on) forming the face. In this way, the first AF calculating section 39b can specify the focus detecting area relatively easily.

(2) The first AF calculating section 39b specifies the optional area corresponding to the positions of eyes in a face area of the selected target as the focus detecting area. This is because it is preferable to focus on the eyes when photographing a person. Specifically, the first AF calculating section 39b obtains positions of eyes based on feature points of the face area and specifies the focus detecting area.

Here, when there are two or more optional areas corresponding to the positions of eyes in the face area, the first AF calculating section 39b further specifies the focus detecting area by either of the following methods.

First, the first AF calculating section 39b specifies an optional area closer to the center of the shooting screen as the focus detecting area. In this way, the electronic camera can realize AF in line with the user's general photographing intention.

Secondly, the first AF calculating section 39b compares outputs of the above optional areas corresponding to eyes and specifies the optional area located where the object is on the side closest to the camera as the focus detecting area. In this way, the electronic camera can realize AF that is more suitable, for example, in a scene of photographing a person obliquely facing the camera.

Step 109: the first AF calculating section 39b performs AF based on the defocus amount of the focus detecting area specified in S108. Incidentally, the AF of the first AF calculating section 39b in S109 is performed for narrowing down the search range of the AF by the second AF calculating section 39d.

Step 110: the second AF calculating section 39d performs the contrast detection AF with reference to the focus detecting area of S108. Thereafter, the process proceeds to S113.

Step 111: the second AF calculating section 39d performs the contrast detection AF with reference to the position of the face area (S105) of the main object. Note that in this S111, the AF is performed for a face located outside the range overlapping with the above optional areas of the focus detecting section 19. Thereafter, the process proceeds to S113.

Step 112: in this flow, the CPU 39 performs AF with an object other than a face being the main object by an algorithm for normal shooting. For example, the CPU 39 selects the focus detecting area from the center or the side closest to the camera by priority, and performs AF by the first AF calculating section 39b. The CPU 39 may of course perform hybrid AF by operating both the first AF calculating section 39b and the second AF calculating section 39d.

Step 113: the AE calculating section 39a of the CPU 39 performs an AE calculation based on the through image to adjust the shooting condition.

Here, when the face area is detected in S103, it is preferable that the AE calculating section 39a adjusts the depth of field by controlling an aperture value based on an object distance.

Specifically, the AE calculating section 39a obtains the object distance of the face area from the first AF calculating section 39b or the second AF calculating section 39d. Then the AE calculating section 39a increases the aperture value based on the object distance to make the depth of field deeper. This allows to create a state of being in focus on the entire face area. Further, in a scene of photographing plural persons, it becomes possible to focus on all the persons.

Step 114: the CPU 39 determines whether the release button is fully pressed or not.

When the release button is fully pressed (YES side), the process proceeds to S115. On the other hand, when there is no input on the release button (NO side), the CPU 39 waits for full pressing of the release button.

Step 115: the CPU 39 retracts the main mirror 15 from the photographing optical path and drives the first image sensor 17 to shoot an object image.

Step 116: the CPU 39 instructs the recording-purpose imaging section 31 to generate data of the shot image. Then the data of the shot image is recorded in the recording medium 35 finally. Thus, a series of shooting operations is completed. Incidentally, when shooting is continued, the CPU 39 returns to S102 and repeats the above operations.

Figure 7:
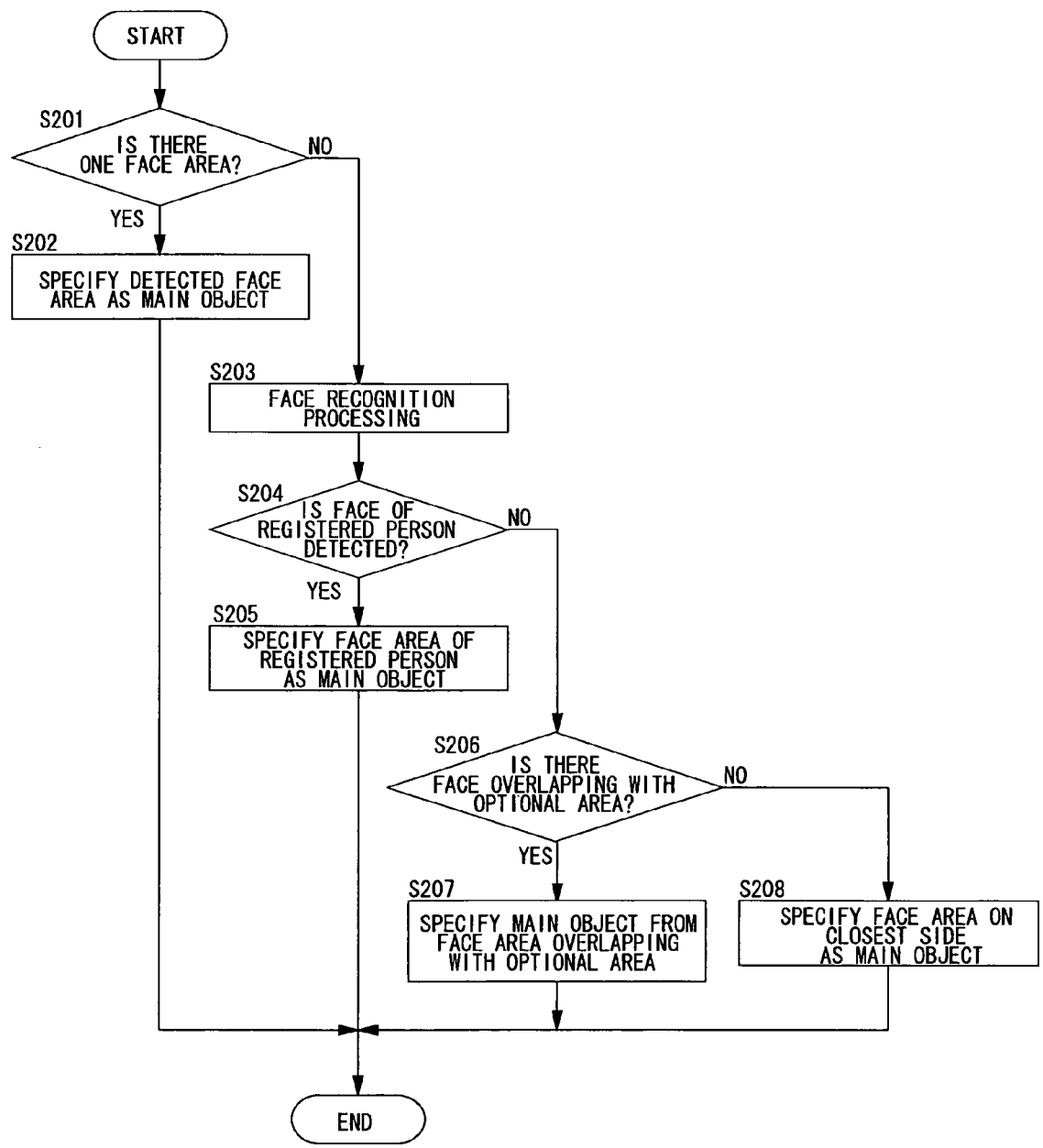
FIG. 7 is a flowchart of a subroutine in S105 of FIG. 5.

Next, an operation of selecting a main object in S105 of FIG. 5 will be described in detail with reference to a flowchart of FIG. 7.

Step 201: the CPU 39 determines whether or not one face area is detected by the face detection processing of S103. When one face area is detected (YES side), the process proceeds to S202. On the other hand, when plural face areas are detected (NO side), the process proceeds to S203.

Step 202: the CPU 39 specifies the detected face area as the main object.

Step 203: the face recognizing section 39e of the CPU 39 performs face recognition processing for detecting a face of a registered person to be a recognized target from the aforementioned face areas based on the data of feature points obtained in the face detection processing of S103 and the face recognizing data in the second memory 40.

Step 204: the CPU 39 determines whether the face of the registered person is detected or not by the face recognition processing of S203. When the face of the registered person is detected (YES side), the process proceeds to S205. On the other hand, when the face area is not detected (NO side), the process proceeds to S206.

Step 205: the CPU 39 specifies the face area of the registered person as the main object. Further, when plural faces of registered persons are detected in S203, the CPU 39 specifies a face among the faces of the registered persons that is close to the center of the shooting screen or a face on the side closest to the camera as the main object.

Here, when the face on the side closest to the camera is specified as the main object, the CPU 39 specifies, as a first method, the face that has the largest area and can be considered as being located on the side closest to the camera as the main object. Alternatively, as a second method, the CPU 39 may obtain the object distance from the first AF calculating section 39b and specify the face on the side closest to the camera as the main object. In addition, in the above second method, it is preferable that the CPU 39 determines the face on the side closest to the camera based on the positions of eyes in the face area.

Step 206: the CPU 39 determines whether or not there is a face area overlapping with the optional areas of the focus detecting section 19 in the shooting screen. When this condition is met (YES side), the process proceeds to S207. On the other hand, when this condition is not met (NO side), the process proceeds to S208.

Step 207: the CPU 39 specifies the main object from the face area overlapping with the optional areas of the focus detecting section 19. Further, when there are plural face areas satisfying the above condition, the CPU 39 specifies the face area on the side closest to the camera as the main object. The method for selecting the face on the side closest to the camera is the same as in S205, and thus overlapping description is omitted.

Step 208: the CPU 39 specifies the face area on the side closest to the camera from the plural detected face areas as the main object. The method for selecting the face on the side closest to the camera is the same as in S205, and thus overlapping description is omitted. In addition, this S208 results in that the face area of the main object is selected from the outside of the range overlapping with the optional areas of the focus detecting section 19.

Hereinafter, effects of the electronic camera of the first embodiment will be described.

The electronic camera of the first embodiment performs the hybrid AF when the face of a main object is detected in the range overlapping with the optional areas of the focus detecting section 19. That is, in the above case, the electronic camera limits the search range by phase difference detection AF, and thereafter performs fine adjustment of the focus position by the contrast detection AF (S106 to S110). Therefore, the electronic camera of the first embodiment can realize AF that is targeted at the face of an object overlapping with the optional areas of the focus detecting section 19, and in which the time required until focusing is reduced while ensuring high focusing accuracy.

Moreover, the electronic camera of the first embodiment performs the contrast detection AF based on an output of the analyzing-purpose imaging section 32 (S106, S111) when the face of a main object is detected in the range not overlapping with the optional areas of the focus detecting section 19. Therefore, with the electronic camera of the first embodiment, AF can be performed also for a face detected outside the range overlapping with the optional areas of the focus detecting section 19, and thus focusing in line with the user's intention can be performed flexibly.

(Description of a Second Embodiment)

Figure 8:
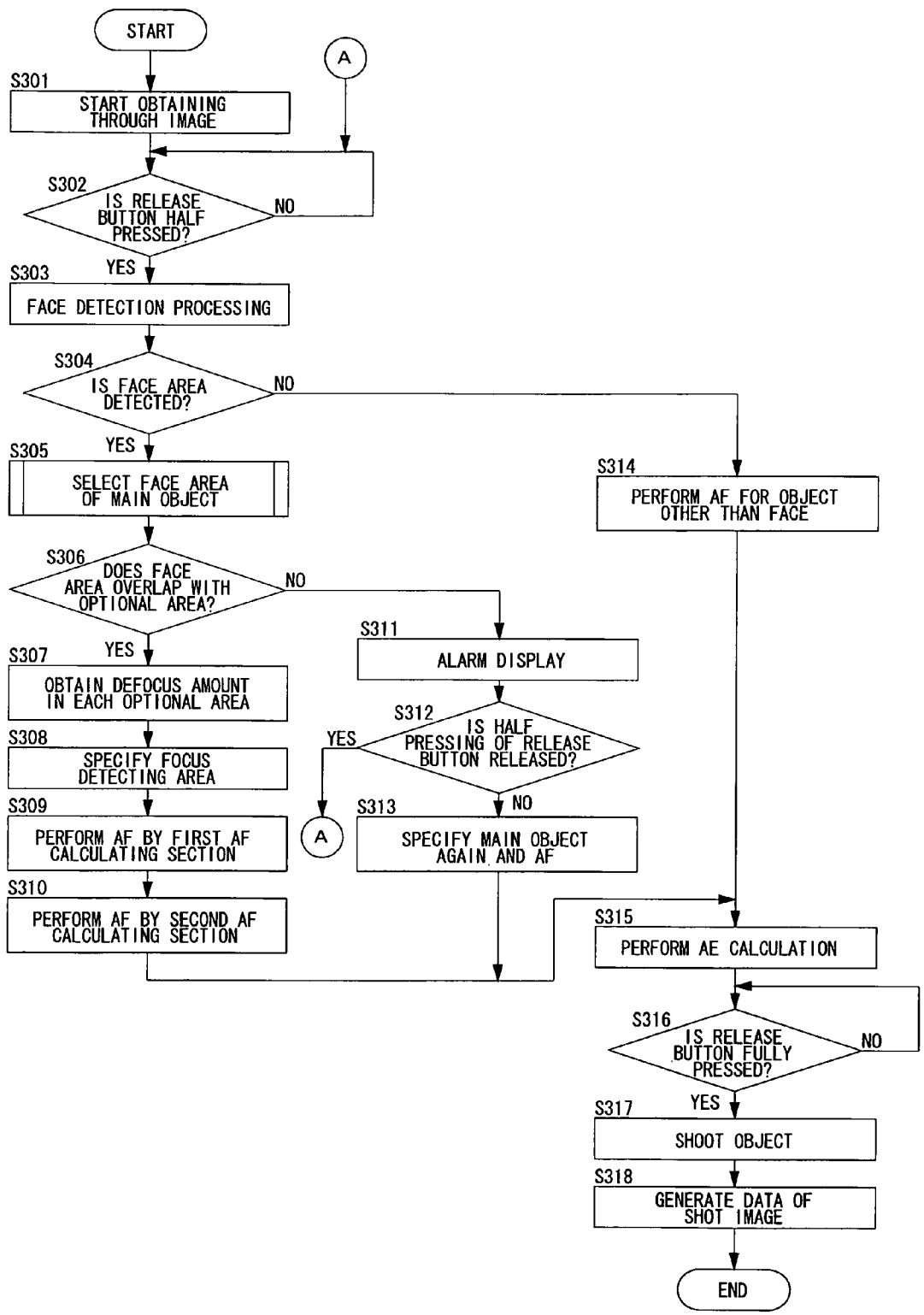
FIG. 8 is a flowchart showing a shooting operation example of an electronic camera in a second embodiment.

FIG. 8 is a flowchart showing a shooting operation example of an electronic camera according to a second embodiment. Here, the basic structure of the electronic camera in the embodiment below is common to that of the first embodiment, and hence overlapping description is omitted.

The second embodiment is a modification example of the first embodiment, and S301 to S310 in FIG. 8 correspond respectively to S101 to S110 of the first embodiment. Further, S314 to S318 in FIG. 8 correspond respectively to S112 to S116 of the first embodiment. Accordingly, overlapping description of the above steps shown in FIG. 8 is omitted.

Step 311: the CPU 39 instructs the in-finder display panel 37a to perform alarm display. The in-finder display panel 37a lights a predetermined display segment to perform alarm display indicating that the face area of the main object is located outside the range overlapping with the optional areas of the focus detecting section 19.

Step 312: the CPU 39 determines whether half pressing of the release button is released or not. When the half pressing of the release button is released (YES side), it returns to S302 and the CPU 39 waits for a half press operation. On the other hand, when the half pressing of the release button is continued (NO side), the process proceeds to S313.

Step 313: the CPU 39 specifies again the main object and performs AF. Thereafter, the process proceeds to S315 (corresponding to S113 of the first embodiment).

Here, in S313, the CPU 39 specifies the object overlapping with the optional areas of the focus detecting section 19 as the main object. For example, the CPU 39 specifies again an object other than a face as the main object by the algorithm for normal shooting. Alternatively, when a face located outside the range overlapping with the above optional areas is specified as the main object by face recognition processing (as in S205 shown in FIG. 7), the CPU 39 specifies again the main object from the face of a person other than the registered person. Incidentally, in S313, the CPU 39 performs AF by the first AF calculating section 39b. The CPU 39 may of course perform hybrid AF by operating both the first AF calculating section 39b and the second AF calculating section 39d.

The electronic camera of the second embodiment performs the warning display when the face of the main object is located outside the range overlapping with the optional areas of the focus detecting section 19, specifies the main object again, and performs AF (S311 to S313). Therefore, with the electronic camera of the second embodiment, the user can easily comprehend a situation that the hybrid AF cannot be performed by alarm display.

(Description of a Third Embodiment)

FIG. 9 is a flowchart showing a shooting operation example of an electronic camera according to a third embodiment.

The third embodiment is a modification example of the first embodiment, and S401 to S408 in FIG. 9 correspond respectively to S101 to S108 of the first embodiment. Further, S414 to S419 in FIG. 9 correspond respectively to S111 to S116 of the first embodiment. Accordingly, overlapping description of the above steps shown in FIG. 9 is omitted.

Step 409: the first AF calculating section 39b of the CPU 39 calculates a first object distance from a defocus amount of the focus detecting area.

Step 410: CPU 39 calculates a second object distance from the size of a face area of the main object. For example, based on a table or a calculation formula representing the correspondence between the size of a face area and an object distance, the CPU 39 can obtain the second object distance from the size of the face area.

Step 411: the CPU 39 determines whether or not a difference between the first object distance (S409) and the second object distance (S410) is in the range of tolerated error. When this condition is met (YES side), the process proceeds to S412. On the other hand, when this condition is not met (NO side), the process proceeds to S413.

Step 412: the first AF calculating section 39b performs AF based on the defocus amount of the focus detecting area specified in S408. Thereafter, the process proceeds to S416 (corresponding to S113 of the first embodiment).

Step 413: the second AF calculating section 39*d* performs the contrast detection AF based on the focus detecting area of S408. Thereafter, the process proceeds to S416 (corresponding to S113 of the first embodiment).

The electronic camera of the third embodiment performs the phase difference detection AF when the difference between the first and second object distances is small, and meanwhile performs the contrast detection AF when the difference between the first and second object distances is large. Therefore, the electronic camera of the third embodiment is capable of selecting and using AF by face detection more appropriately for each scene of shooting, depending on reliability of object distances by the focus detecting section 19.

(Description of a Fourth Embodiment)

Figure 10:
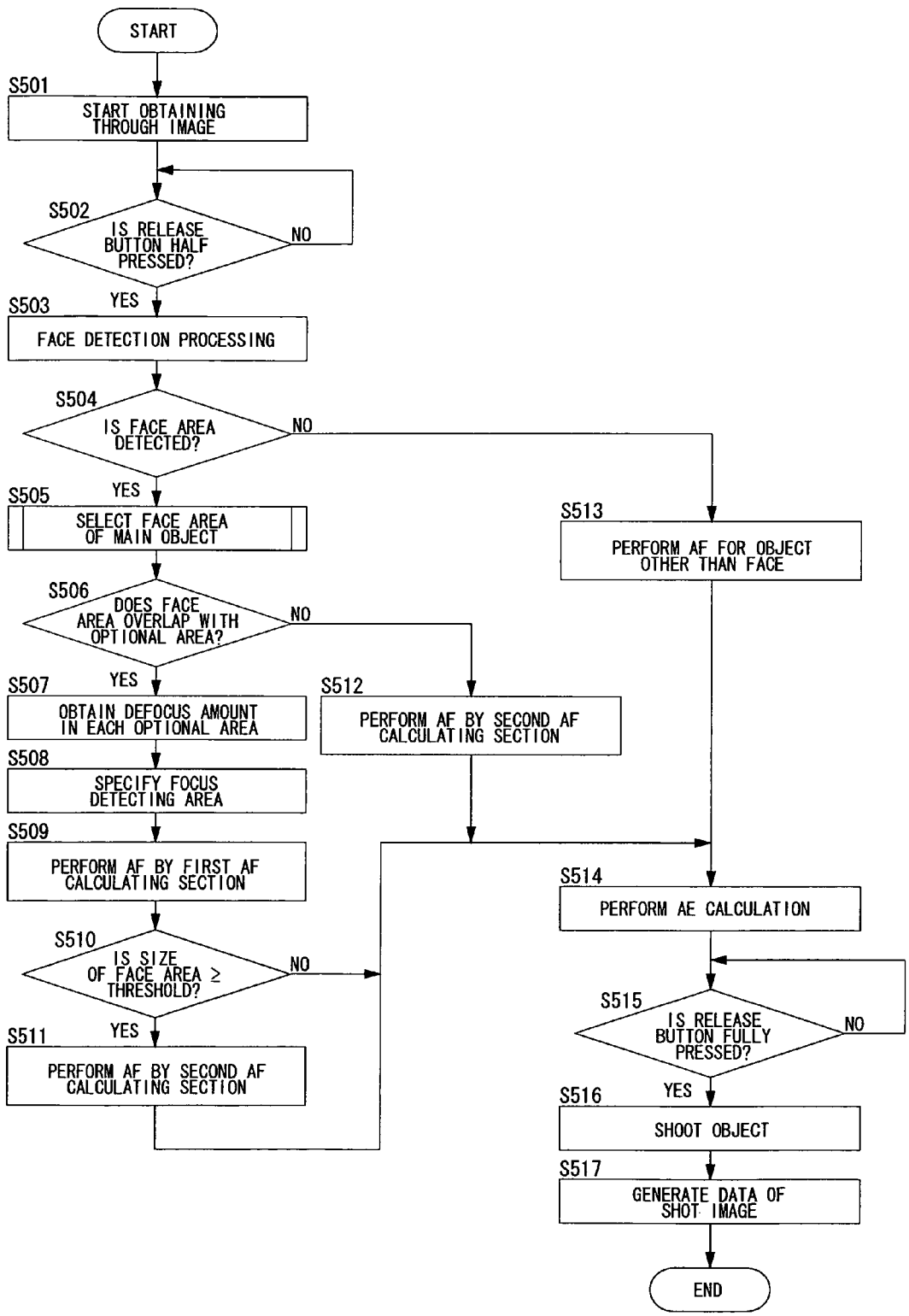
FIG. 10 is a flowchart showing a shooting operation example of an electronic camera in a fourth embodiment.

FIG. 10 is a flowchart showing a shooting operation example of an electronic camera according to a fourth embodiment.

The fourth embodiment is a modification example of the first embodiment, and S501 to S509 in FIG. 10 correspond respectively to S101 to S109 of the first embodiment. Further, S511 to S517 in FIG. 10 correspond respectively to S110 to S116 of the first embodiment. Accordingly, overlapping description of the above steps shown in FIG. 10 is omitted.

Step 510: the CPU 39 determines whether the size of a face area of the main object is equal to or larger than a threshold value or not. When the size of the face area is equal to or larger than the threshold value (YES side), the process proceeds to S511. In this flow, after the phase difference detection AF by the first AF calculating section 39*b* is performed, the contrast detection AF is further performed by the second AF calculating section 39*d* (S511). On the other hand, when the size of the face area is smaller than the threshold value (NO side), the process proceeds to S514. In this flow, after the phase difference detection AF by the first AF calculating section 39*b* is performed, the process proceeds without performing the contrast detection AF.

The electronic camera of the fourth embodiment performs the hybrid AF when the size of the face area of the main object is equal to or larger than the threshold value. Accordingly, focusing accuracy on the face of the main object can be improved more, for example, in a scene in which it is desired to shoot the face of the object large, such as in portrait shooting or close-up shooting where a person is the main object.

On the other hand, when the face of the main object overlaps with the optional areas but the size of the face area is smaller than the threshold value, the electronic camera only performs the phase difference detection AF. Thus, in a scene where appearance of the face of the main object is not so important, as in shooting scenery for example, AF can be performed quickly.

(Supplementary Items of the Embodiments)

(1) In the above embodiments, examples of a digital camera of single lens reflex type are described, but the present invention is applicable to film cameras of single lens reflex type.

(2) In the above embodiments, an example of performing face detection processing in response to a half pressing operation of the release button is described, but it may be arranged that the CPU performs the face detection processing from a through image at constant intervals.

(3) In the above embodiments, an example of performing framing with the finder optical system is described, but it may be arranged that the framing is performed by displaying a moving image based on the through image on the monitor.

(4) In the above first and second embodiments, it may be arranged that when the face area of the main object is overlapping with any one of the optional areas (YES sides in S106, S306), the CPU 39 performs AF by a defocus amount of the focus detecting section 19, and the contrast detection AF is omitted.

(5) In the first embodiment, it may be arranged that when plural faces are detected and plural optional areas correspond to the face area of the main object (S108), the CPU 39 simplifies specifying of the focus detecting area to alleviate the calculation load. For example, it may be arranged that the CPU 39 mechanically specifies an optional area closer to the center of the shooting screen as the focus detecting area, among the optional areas corresponding to the face area of the main object.

(6) In the second embodiment, it may be arranged that when the face of the main object is located outside the range overlapping with the optional areas of the focus detecting section 19, the CPU 39 does not perform AF after performing alarm display in S311.

(7) In the second embodiment, it may be arranged that the alarm display in S311 is performed not in the in-finder display panel 37*a*. For example, it may be arranged that the CPU 39 performs the alarm display on a display panel (not shown) arranged on a back face or upper face of the digital camera or on the monitor 37. Further, it may be arranged that alarming the user is performed by sound via a buzzer (not shown) for example.

(8) In the third embodiment, it may be arranged that when a difference between the first and second object distances is within the range of tolerable error (YES side in S411), the CPU 39 performs the hybrid AF. Further, it may be arranged that when a difference between the first and second object distances is out of the range of tolerable error (NO side in S411), the CPU 39 alternatively performs AF based on the second object distance.

(9) In the above embodiments, examples in which the image sensor (24) dedicated to face detection is provided are described, but it may be arranged that the face detection is performed by a photometric sensor. Further, it may be arranged that the face detection is performed by the image sensor (17) which images a recording-purpose image.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A camera comprising:
   an image sensor imaging an object image;
   a face detecting section detecting a face area in a shooting screen based on an output of the image sensor;
   a focus detecting section having a plurality of optional areas in the shooting screen and calculating a defocus amount from a relative interval of a pair of images based on an optical flux passed through a shooting lens in each of the optional areas;
   a first focus controlling section specifying a focus detecting area from the optional areas based on an output of the face detecting section and performing a focus operation of the shooting lens based on the defocus amount of the focus detecting area;
   a second focus controlling section calculating a focus evaluation value in the face area based on an output of the image sensor, searching a lens position where the focus evaluation value becomes a maximum value, and performing a focus operation; and a control section causing at least one of the first focus controlling section and the second focus controlling section to perform a focus operation, wherein:

when the face area is detected within a calculable range of the defocus amount, the control section causes the first focus controlling section to perform a focus operation, and thereafter further causes the second focus controlling section to perform a focus operation, and when the face area is detected outside a calculable range of the defocus amount, the control section causes the second focus controlling section to perform a focus operation.

2. The camera according to claim 1, further comprising an alarm section alarming a user when the face area is detected outside a calculable range of the defocus amount.

3. The camera according to claim 1, wherein when there is a plurality of the optional areas corresponding to the face area, the first focus controlling section specifies one of the optional areas closest to a center of the face area as the focus detecting area.

4. The camera according to claim 1, wherein when there is a plurality of the optional areas corresponding to the face area, the first focus controlling section specifies one of the optional areas corresponding to positions of eyes of the face area as the focus detecting area.

5. The camera according to claim 4, wherein when there is a plurality of the optional areas corresponding to positions of eyes of the face area, the first focus controlling section specifies one of the optional areas closest to a center of the shooting screen as the focus detecting area.

6. The camera according to claim 4, wherein when there is a plurality of the optional areas corresponding to positions of eyes of the face area, the first focus controlling section specifies one of the optional areas where the eyes of the face area are on a side closest to the camera as the focus detecting area.

7. The camera according to claim 1, further comprising:
a memory recording registration data indicating feature points of a face to be a recognized target; and
a face recognizing section extracting feature points of a face of an object from the face area, and determining whether or not the face area is the recognized target based on data of the feature points extracted from the face area and the registration data, wherein
when a detected number of the face area is two or more, the first focus controlling section specifies the focus detecting area from one of the optional areas corresponding to the face of the recognized target.

8. The camera according to claim 1, wherein when a detected number of the face area is two or more, the first focus controlling section specifies the focus detecting area from one of the optional areas corresponding to a face on a side closest to the camera.

9. The camera according to claim 8, wherein the first focus controlling section specifies the focus detecting area from a face of which portions of eyes of the face area are on the side closest to the camera.

10. The camera according to claim 1, further comprising:
a memory recording registration data indicating feature points of a face to be a recognized target;
a face recognizing section extracting feature points of a face of an object from the face area, and determining whether or not the face area is the recognized target based on data of the feature points extracted from the face area and the registration data; and
an alarm section alarming a user when the face area of the recognized target is detected outside a calculable range of the defocus amount.

11. The camera according to claim 1, wherein the control section adjusts a depth of field based on the defocus amount obtained from each of a plurality of the optional areas located in the face area.

12. A camera comprising:
an image sensor imaging an object image;
a face detecting section detecting a face area in a shooting screen based on an output of the image sensor;
a focus detecting section having a plurality of optional areas in the shooting screen and calculating a defocus amount from a relative interval of a pair of images based on an optical flux passed through a shooting lens in each of the optional areas;
a first focus controlling section specifying a focus detecting area from the optional areas based on an output of the face detecting section and performing a focus operation of the shooting lens based on the defocus amount of the focus detecting area;
a second focus controlling section calculating a focus evaluation value in the face area based on an output of the image sensor, searching a lens position where the focus evaluation value becomes a maximum value, and performing a focus operation:
a control section causing at least one of the first focus controlling section and the second focus controlling section to perform a focus operation; and
an object distance calculating section calculating a first object distance based on the defocus amount of the focus detecting area and calculating a second object distance based on a size of the face area, when the face area is detected within a calculable range of the defocus amount, wherein
the control section determines necessity of a focus operation of each of the first focus controlling section and the second focus controlling section based on a difference between the first object distance and the second object distance.

13. A camera comprising:
an image sensor imaging an object image;
a face detecting section detecting a face area in a shooting screen based on an output of the image sensor;
a focus detecting section having a plurality of optional areas in the shooting screen and calculating a defocus amount from a relative interval of a pair of images based on an optical flux passed through a shooting lens in each of the optional areas;
a first focus controlling section specifying a focus detecting area from the optional areas based on an output of the face detecting section and performing a focus operation of the shooting lens based on the defocus amount of the focus detecting area;
a second focus controlling section calculating a focus evaluation value in the face area based on an output of the image sensor, searching a lens position where the focus evaluation value becomes a maximum value, and performing a focus operation;
a control section causing at least one of the first focus controlling section and the second focus controlling section to perform a focus operation;
a memory recording registration data indicating feature points of a face to be a recognized target; and a face recognizing section extracting feature points of a face of an object from the face area, and determining whether or not the face area is the recognized target based on data of the feature points extracted from the face area and the registration data, wherein when the face area of the recognized target is detected outside a calculable range of the defocus amount, the control section causes the second focus controlling section to perform a focus operation based on the face area of the recognized target.

14. A camera comprising:

an image sensor imaging an object image;

a face detecting section detecting a face area in a shooting screen based on an output of the image sensor;

a focus detecting section having a plurality of optional areas in the shooting screen and calculating a defocus amount from a relative interval of a pair of images based on an optical flux passed through a shooting lens in each of the optional areas:

a first focus controlling section specifying a focus detecting area from the optional areas based on an output of the face detecting section and performing a focus operation of the shooting lens based on the defocus amount of the focus detecting area;

a second focus controlling section calculating a focus evaluation value in the face area based on an output of the image sensor, searching a lens position where the focus evaluation value becomes a maximum value, and performing a focus operation; and a control section causing at least one of the first focus controlling section and the second focus controlling section to perform a focus operation, wherein when a size of the face area is equal to or larger than a threshold, the control section causes the first focus controlling section to perform a focus operation and thereafter further causes the second focus controlling section to perform a focus operation, and when the size of the face area is smaller than the threshold, the control section causes the first focus controlling section to perform a focus operation.

* * * * *